(12) United States Patent
Yu et al.

(10) Patent No.: US 8,687,595 B2
(45) Date of Patent: Apr. 1, 2014

(54) METHOD, APPARATUS, AND SYSTEM FOR IMPLEMENTING USER EQUIPMENT HANDOVER

(75) Inventors: Yijun Yu, Shanghai (CN); Zhongping Chen, Shanghai (CN); Qing Zhou, Berlin (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 41 days.

(21) Appl. No.: 13/166,418

(22) Filed: Jun. 22, 2011

(65) Prior Publication Data

US 2011/0249654 A1    Oct. 13, 2011

Related U.S. Application Data

(63) Continuation of application No. PCT/CN2009/075845, filed on Dec. 22, 2009.

(30) Foreign Application Priority Data

Dec. 22, 2008 (CN) .......................... 2008 1 0240704
Mar. 16, 2009 (CN) .......................... 2009 1 0129618

(51) Int. Cl.
    *H04W 4/00*    (2009.01)
(52) U.S. Cl.
    USPC .......................................... 370/331; 455/436
(58) Field of Classification Search
    USPC .................................... 370/331–334; 455/436
    See application file for complete search history.

(56) References Cited

U.S. PATENT DOCUMENTS

| 2009/0268722 A1* | 10/2009 | Gallagher et al. | 370/352 |
| 2010/0135246 A1* | 6/2010 | Hallental | 370/331 |
| 2010/0190500 A1* | 7/2010 | Choi et al. | 455/436 |
| 2011/0280217 A1* | 11/2011 | Drevon et al. | 370/331 |

FOREIGN PATENT DOCUMENTS

| CN | 101252777 A | 8/2008 |
| CN | 101594647 A | 12/2009 |
| WO | WO 2007/103369 A2 | 9/2007 |
| WO | WO 2008/038949 A1 | 4/2008 |
| WO | WO 2009/018785 A1 | 2/2009 |

OTHER PUBLICATIONS

Office Action issued in corresponding Chinese Patent Application No. 200910129618,7, mailed Sep. 15, 2011.
Global System for Mobile Communications, "$3^{rd}$ Generation Partnership Project; Technical Specification Group GSM/EDGE Radio Access Network; Generic Access Network (GAN)" Stage 2, Release 8. 3GPP TS 43.318, V8.3.0, Aug. 2008.

(Continued)

*Primary Examiner* — Chi Pham
*Assistant Examiner* — Fahmida Chowdhury
(74) *Attorney, Agent, or Firm* — Brinks Gilson & Lione

(57) ABSTRACT

A method, an apparatus, and a system for implementing User Equipment (UE) handover are disclosed. A Mobility Management Entity (MME) obtains address information of a serving Interworking Function (IWF) by interacting with a function entity in a network and notifies the IWF to process handover according to the obtained IWF address information, so that the MME is capable of obtaining the address information of the serving IWF. Therefore, the normal proceeding of a UE handover procedure in a Circuit Switched over Packet Switched (CSoEPS) scenario is ensured.

12 Claims, 11 Drawing Sheets

(56) References Cited

OTHER PUBLICATIONS

LTE, "3$^{rd}$ Generation Partnership Project; Technical Specification Group Core Network and Terminals; Basic Call Handling; Technical Realization" Release 8, 3GPP TS 23.018, V8.1.1, Dec. 2008.
Extended European Search Report issued in corresponding European Patent Application No. 09834102.7, mailed Feb. 6, 2012.
GSM, "3rd Generation Partnership Project; Technical Specification Group Core Network and Terminals; Numbering, Addressing and Identification" (Release 8) 3GPP TS 23.003. V8.2.0, Sep. 2008.
LTE, "3$^{rd}$ Generation Partnership Project; Technical Specification Group Services and System Aspects; Study on Circuit Switched (CS) Domain Services Over Evolved Packet Switched (PS) Access" Stage 2 (Release 9) 3GPP TR 23.879. V1.1.1, Dec. 2008.
Office Action issued in corresponding Chinese Patent Application No. 200910129618.7, mailed Feb. 13, 2012.
Written Opinion of the International Searching Authority issued in corresponding PCT Patent Application No. PCT/CN2009/075845, mailed Apr. 1, 2010.
International Search Report issued in corresponding PCT Patent Application No. PCT/CN2009/075845, mailed Apr. 1, 2010.
"Voice over LTE via Generic Access" Stage 2 Specification; Phase 1. V.o.L.G.A. Stage 2, V0.0.1, Mar. 6, 2009.
VoLGA, "Voice over LTE via Generic Access; Stage 2 Specification; Phase 1" V1.2.0, Aug. 24, 2008, 89 pages.

* cited by examiner

METHOD, APPARATUS, AND SYSTEM FOR IMPLEMENTING USER EQUIPMENT HANDOVER

CROSS-REFERENCE TO RELATED APPLICATIONS

This application is a continuation of International Application No. PCT/CN2009/075845, filed on Dec. 22, 2009, which claims priority to Chinese Patent Application No. 200810240704.0, filed on Dec. 22, 2008 and Chinese Patent Application No. 200910129618.7, filed on Mar. 16, 2009, all of which are hereby incorporated by reference in their entireties.

FIELD OF THE INVENTION

The present invention relates to communications technologies, and in particular, to a method, an apparatus, and a system for implementing user equipment (UE) handover.

BACKGROUND OF THE INVENTION

An Evolved Packet System (EPS) is new mobile communication network architecture defined by the 3rd Generation Partnership Project (3GPP) under the instruction of Long Term Evolution (LTE). The new architecture is flatter than the prior General Packet Radio Service (GPRS) network and the Universal Mobile Telecommunications System (UMTS) and reserves only the Packet Switched (PS) domain.

However, because many services of operators are provided in the Circuit Switched (CS) domain, to implement the existing CS services over an LTE network, a method for connecting to the CS domain through an EPS network is proposed.

As shown in FIG. 1, a Packet Data Network Gateway (PDN-GW) in the EPS network is connected to a Mobile Switching Center (MSC) in the conventional CS domain through an Interworking Function (IWF), where the IWF is capable of simulating the Iu-CS interface or A-interface, for example, through configuration of the protocol stack of the Iu-CS interface or A-interface. When the UE intends to communicate with the MSC, the UE sends a message to the IWF and the IWF may convert the received message into the signaling format of the Iu-CS interface or A-interface and send the converted message to the MSC. Therefore, the communication between the UE and the MSC is implemented. Similarly, the IWF may forward a message received from the MSC to the UE. In this communication mode, the LTE network serves as an interactive channel between the UE and the IWF.

In the above network architecture, the UE exchanges signaling and data with the IWF through a logical interface Z1, which can be understood as a reference point or an Internet Protocol (IP) path. The signaling or data exchanged between the UE and the IWF is carried over a user plane tunnel of the EPS network. The signaling and data are transferred between the UE, an evolved NodeB (eNodeB), a Serving Gateway (S-GW) or a PDN-GW, and the IWF.

This shows that the signaling or data exchanged between the UE and the IWF will not pass through a Mobility Management Entity (MME) in the architecture, which means that the interaction between the UE and the IWF is transparent to the MME in the network architecture.

Consequently, the handover from an LTE network to a GSM/EDGE Radio Access Network (GERAN) or UMTS Terrestrial Radio Access Network (UTRAN) might fail, where GSM is short for Global System for Mobile communications, and EDGE is short for Enhanced Data rate for GSM Evolution.

SUMMARY OF THE INVENTION

The purpose of the embodiments of the present invention is to provide a method, an apparatus, and a system for implementing UE handover to ensure normal proceeding of a UE handover procedure in a CS over EPS (CSoEPS) scenario.

An embodiment of the present invention provides a method for implementing UE handover. The method includes:
obtaining, by a Handover Selection Function (HOSF), address information of an Interworking Function (IWF);
receiving, by the HOSF, a UE handover notification; and
notifying, by the HOSF, the IWF to process handover according to the obtained address information of the IWF.

An embodiment of the present invention provides a method for obtaining Mobility Management Entity (MME) address information, comprising:
receiving, by a Handover Selection Function (HOSF), a message sent by an Interworking Function (IWF), wherein the message carries a Globally Unique Temporary Identity (GUTI) which comprises an MME ID; and
resolving, by the HOSF, the GUTI to obtain address information of an MME.

An embodiment of the present invention provides an Interworking Function (IWF), comprising:
a Mobility Management Entity (MME) address obtaining unit, adapted to interact with a User Equipment (UE) to obtain address information of a Mobility Management Entity (MME) which the UE is registered with;
a Handover Selection Function (HOSF) address obtaining unit, adapted to obtain address information of an HOSF according to the address information of the MME; and
a sending unit, adapted to provide an address of the IWF to the HOSF corresponding to the address information of the HOSF.

According to the technical solution of the present invention, an MME obtains address information of a serving IWF by interacting with a function entity in the network and notifies the IWF to process handover according to the obtained IWF address information, so that the MME is capable of obtaining the address information of the serving IWF. Therefore, the present invention ensures normal proceeding of a UE handover procedure in a CSoEPS scenario.

DETAILED DESCRIPTION OF THE EMBODIMENTS

Embodiments of the present invention provide a method for implementing UE handover, where a function entity in a network interacts with an MME so that the MME obtains address information of a serving IWF and the MME notifies the IWF to process handover according to the obtained address information. Therefore, the present invention prevents the possible UE handover failure in the prior art and ensures stability of the network.

To better explain the purpose, technical solution, and benefits of the present invention, specific implementations of the method for implementing UE handover in the embodiments of the present invention in different scenarios are described in detail with reference to the accompanying drawings.

Figure 1:
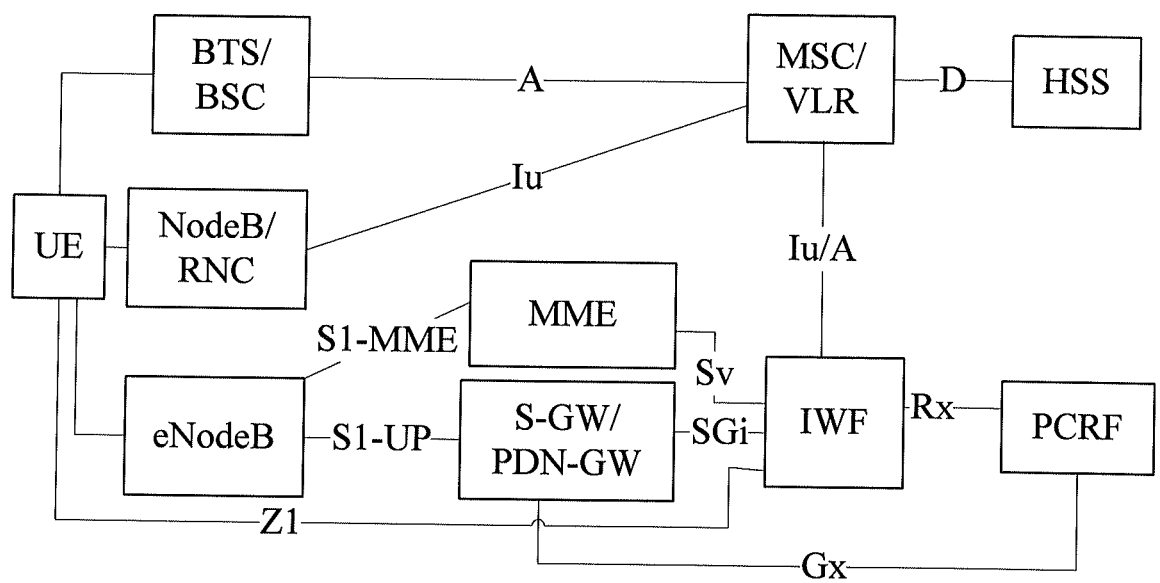
FIG. 1 illustrates a network architecture in a prior art.
Figure 2:
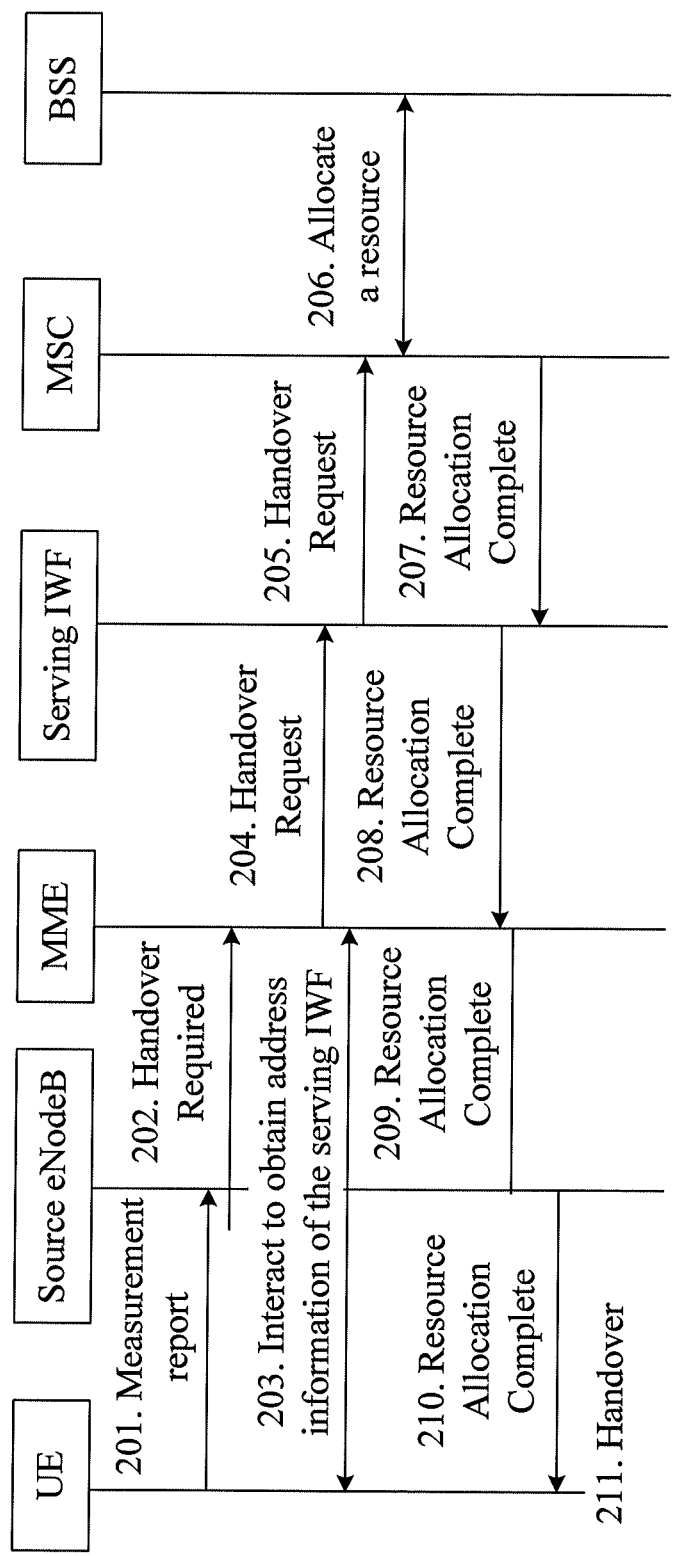
FIG. 2 is a flowchart of a method for implementing UE handover according to an embodiment of the present invention.

As shown in FIG. 2, the method for implementing UE handover in an embodiment of the present invention includes the following steps:

Step 201: A source eNodeB receives a measurement report sent by a UE and triggers handover of the UE from an LTE network to a GERAN or UTRAN.

It should be noted that the embodiment of the present invention does not limit the technical processes required by the handover other than the process that the MME obtains the serving address of the IWF, and any technical process can be adopted if the purpose is achieved.

Step 202: The source eNodeB sends a Handover Required message to the MME.

The Handover Required message carries an Information Element (IE) instructing the source MME to hand an LTE network service, such as a voice service, over to the CS domain of a GERAN or UTRAN.

Step 203: The MME interacts with the UE to obtain address information of the serving IWF (that is, the IWF where the UE is registered).

Figure 3:
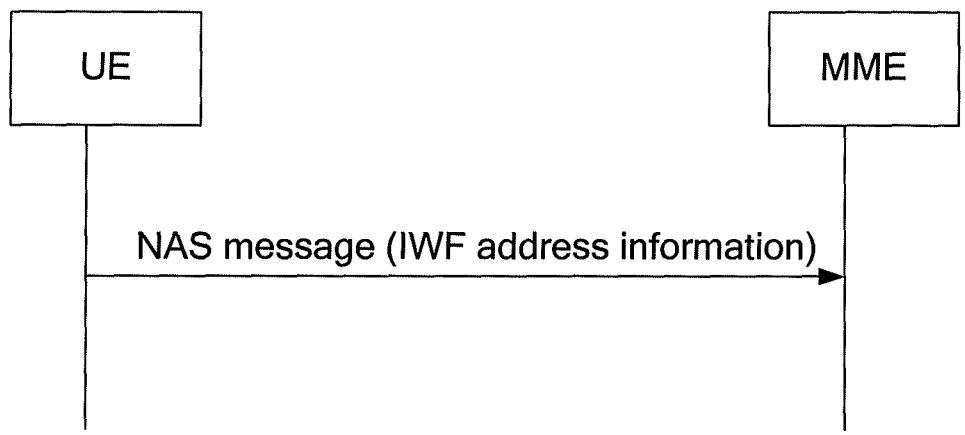
FIG. 3 shows a first procedure where an MME obtains address information of an IWF in the method according to an embodiment of the present invention.

In a specific embodiment of the present invention, as shown in FIG. 3, the UE reports the serving IWF address information to the MME through a Non Access Stratum (NAS) message, so that the MME obtains the serving IWF address.

It should be noted that the IWF address information described in the embodiment of the present invention may be an IP address of the IWF or an identity of the IWF, such as an IWF ID or an IWF number. Through the IWF address information, the MME or other related network elements may address the IWF.

The trigger point where the UE reports IWF address information to the MME may be as follows:

(1) The UE may be triggered by a CS service to report the IWF address information to the MME.

The UE can interact with the IWF only when the UE is in a connected state. When the UE in an idle state needs to carry out a CS service, the UE needs to carry out a service request procedure to change from the idle state to the connected state before the UE can interact with the IWF. In the embodiment of the present invention, the Service Request (a type of NAS message) involved when the UE carries out the service request procedure may carry the address information of the IWF, and the address information is reported by the UE to the MME.

It is understandable that, if the UE is in the connected state, the UE may report the address information of the IWF to the MME by using other NAS messages. Or a new NAS message may be defined to report the address information of the IWF. The embodiment of the present invention does not limit the form of the message.

(2) The UE proactively reports the IWF address information to the MME after the UE completes registration with the IWF.

Specifically, after the UE completes registration with the IWF, the UE carries the address information of the IWF in a Service Request or other NAS messages and reports the address information of the IWF to the MME.

In the embodiment of the present invention, a NAS message that carries the address information of the IWF may be: Attach Request, Tracking Area Update (TAU) Request, Service Request, Detach Request, Request Bearer Resource Allocation, Request Bearer Resource Release, Packet Data Network (PDN) Connectivity Request, or PDN Disconnection Request.

It is understandable that the UE may report the IWF address information to the MME through a new NAS message. The embodiment of the present invention does not limit the form of the message.

Step 204: The MME sends a Handover Request to the IWF according to the obtained address information of the IWF.

The IWF is a serving IWF in the EPS network.

Step 205: The IWF receives the Handover Request and converts the Handover Request into a CS Handover Request and sends the CS Handover Request to an MSC.

The MSC is a serving MSC in the EPS network.

Step 206: The MSC allocates a resource with the target Base Station Subsystem (BSS).

Step 207: The MSC notifies the IWF that resource allocation is complete.

Step 208: The IWF notifies the MME that the resource is set up on the target network.

Step 209: The MME notifies the source eNodeB that handover preparation is complete.

Step 210: The source eNodeB notifies the UE to hand over to the target network.

Step 211: The UE accesses the GERAN. The handover from the LTE network to the CS domain of the GERAN or UTRAN is complete.

It can be seem from the above description that: in the method for implementing UE handover provided in the embodiment of the present invention, through the interaction between the MME and network entities such as the UE, the MME obtains the address information of the serving IWF of the UE and notifies the IWF to process handover according to the obtained address information. Therefore, the method provided in the embodiment of the present invention ensures normal proceeding of a UE handover procedure in a CSoEPS scenario.

Figure 4:
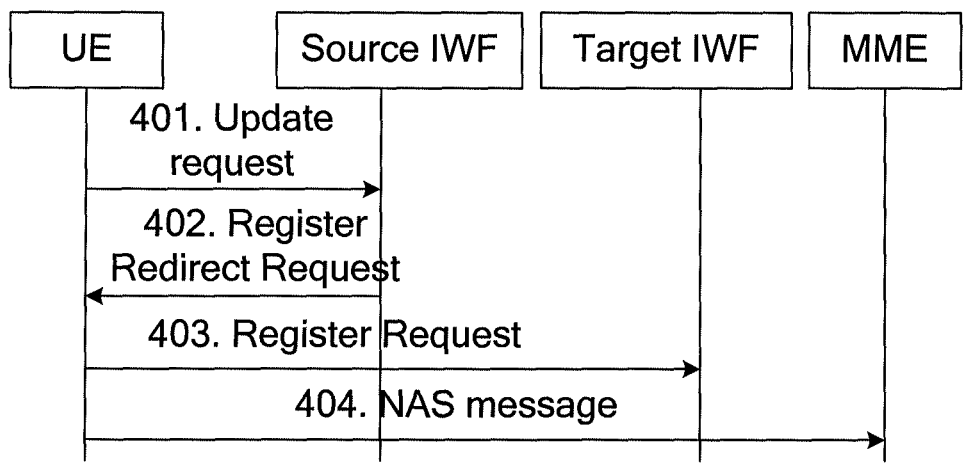
FIG. 4 shows a second procedure where an MME obtains address information of an IWF in the method according to an embodiment of the present invention.

In an embodiment of the method for implementing UE handover, when the serving IWF of the UE changes, the MME needs to update the address information of the serving IWF of the UE. In this case, the UE can send a NAS message when the IWF changes, to report the updated IWF address information to the MME. As shown in FIG. 4, the procedure includes the following steps:

Step 401: The UE sends an update request to a source IWF (the IWF where the UE is registered before the update).

Step 402: The source IWF sends a Register Redirect Request to the UE because it cannot continue serving the UE, and provides related information (including address information) of a target IWF (that is, the IWF where the UE is registered after the update) to the UE.

Step 403: The UE may choose the target IWF as its serving IWF and sends a Register Request to the target IWF.

Step 404: The UE sends a NAS message to notify the MME.

The UE may use an existing NAS message or a new NAS message to report address information of the target IWF to the MME. Therefore, the MME obtains the address information of the IWF that serves the UE after the update.

In another embodiment of the present invention, the IWF interacts with the UE or HSS to obtain address information of the MME and registers with the MME according to the obtained address information. Therefore, the MME obtains the address information of the serving IWF.

A preferred form of the MME address information in the embodiment of the present invention is Globally Unique Temporary Identity (GUTI) or MME ID. The GUTI is a temporary identity allocated by the MME to a user and includes the MME ID which can be used to address the MME. Specifically, in the embodiment of the present invention, the IWF resolves the GUTI to obtain the MME ID and locates the MME according to the MME ID. Later, the IWF can register its address information with the MME. The embodiment of the present invention does not exclude other forms of the address information of the MME. For example, the address information of the MME may be an IP address of the MME.

Figure 5:
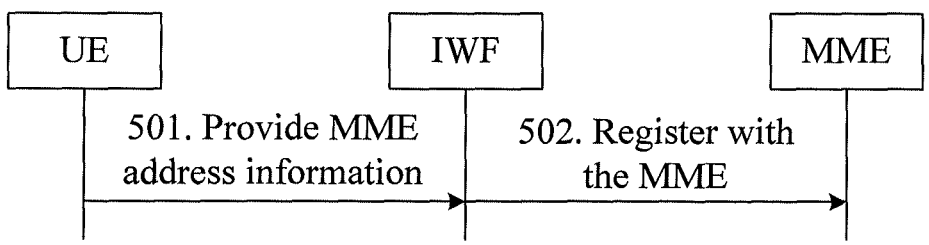
FIG. 5 shows a third procedure where an MME obtains address information of an IWF in the method according to an embodiment of the present invention.

If the IWF interacts with the UE, the procedure includes the following steps as shown in FIG. 5:

Step 501: The UE provides address information of the MME to the IWF during interaction with the IWF.

An interaction scenario in which the UE provides the address information of the MME to the IWF includes any one or all of the following scenarios:

(1) The UE provides the MME address information to the IWF during registration with the IWF, including initial registration procedure or register redirect procedure because of the change of a serving IWF.

Specifically, the GUTI or MME ID is carried in a UE-IWF DISCOVERY REQUEST or UE-IWF REGISTER REQUEST sent by the UE to the IWF.

It should be noted that the embodiment of the present invention does not exclude the case that related messages of other interactions with the IWF also carry the GUTI or MME ID. For example, a UE-IWF REGISTER UPDATE UPLINK message carries the GUTI or MME ID; in a defined periodical update procedure, a UE-IWF KEEP ALIVE message sent by the UE to the IWF carries the GUTI or MME ID.

(2) The UE provides the MME address information to the IWF when the UE is triggered by a CS service. For example, the address information of the MME is provided in every call procedure.

Specifically, a UE-IWF REQUEST sent by the UE to the IWF in a UE-IWF connection setup procedure carries the GUTI or MME ID; or, in a defined procedure of CS signaling connection setup initiated by the UE, a UE-IWF UL DIRECT TRANSFER message sent by the UE to the IWF carries the GUTI or MME ID.

(3) In a case that the UE is already registered with the serving IWF, if the UE receives a GUTI or an MME ID allocated by the MME (for example, when the MME changes), the message sent by the UE to the IWF, such as a UE-IWF REGISTER UPDATE UPLINK, carries the updated GUTI or MME ID.

It should be noted that: If the IWF stores the address information of the MME, when the IWF discovers that the stored address information of the MME changes, the IWF addresses an MME of the new address information and initiates a registration procedure to the MME of the new address information.

It should be noted that: In the above three scenarios, the MME address information is transferred by the UE to the IWF by performing a signaling interaction with the IWF. The embodiment of the present invention does not exclude the case that the UE places the MME address information in a packet destined for the IWF and sends the packet that carries the MME address to the IWF instead of performing a signaling interaction. The IWF resolves the packet to obtain the MME address information.

The trigger condition for the UE to send the packet to the IWF includes the above scenarios (1), (2) and (3).

Step 502: The IWF obtains the address information of the MME that currently serves the UE and sends registration information (including address information of the IWF) to the MME to register the IWF with the MME, so that the MME obtains the address information of the IWF.

Figure 6:
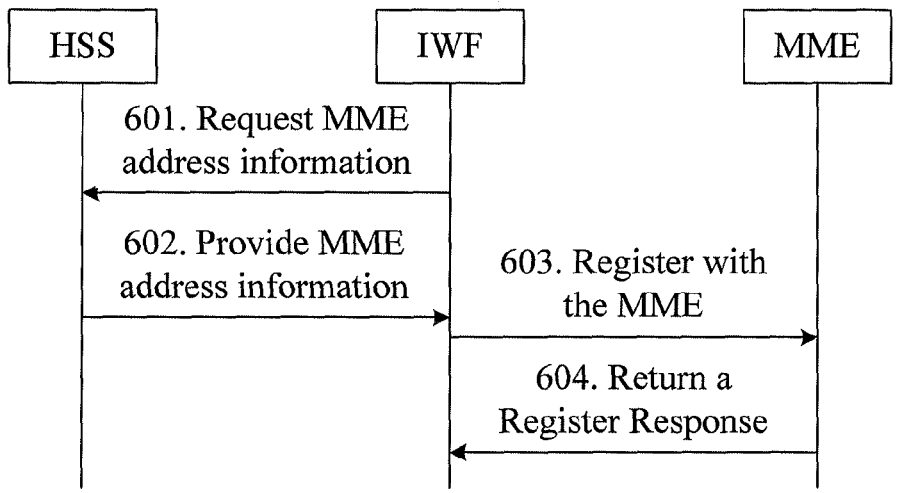
FIG. 6 shows a fourth procedure where an MME obtains address information of an IWF in the method according to an embodiment of the present invention.

If the IWF interacts with the HSS, the procedure includes the following steps as shown in FIG. 6:

Step 601: The IWF requests the HSS for address information of a serving MME, where the serving MME refers to an MME where the UE is registered.

It should be noted that no interface is provided in the prior network architecture for the interaction between the IWF and the HSS. To enable the signaling interaction between the IWF and the HSS, a new interface is added between the IWF and the HSS in the embodiment of the present invention.

The embodiment of the present invention does not limit the form of the new interface.

The trigger point where the IWF requests the HSS for address information of the serving MME may be that the UE completes the registration with the IWF (including when the serving IWF changes) or that the UE is triggered by a CS service.

Specifically, the IWF sends an MME Request to the HSS, requesting the HSS for the address information of the serving MME.

Step 602: The HSS returns the address information of the serving MME to the IWF.

Specifically, the HSS sends an MME Response to the HSS, providing the address information of the serving MME to the IWF.

Step 603: The IWF sends registration information (including IWF address information) to the MME according to the serving MME address information obtained from the HSS to register the IWF with the MME, so that the MME obtains the address information of the IWF.

If necessary, the MME executes step 604 to return a Register Response to the IWF.

In another embodiment of the present invention, the MSC registers IWF address information with the HSS when the MSC registers with the HSS, or the IWF initiates a registration procedure to the HSS to register the IWF address information with the HSS. Later, the HSS sends the IWF address information to the MME as subscription data, so that the MME obtains the address information of the serving IWF.

Figure 7:
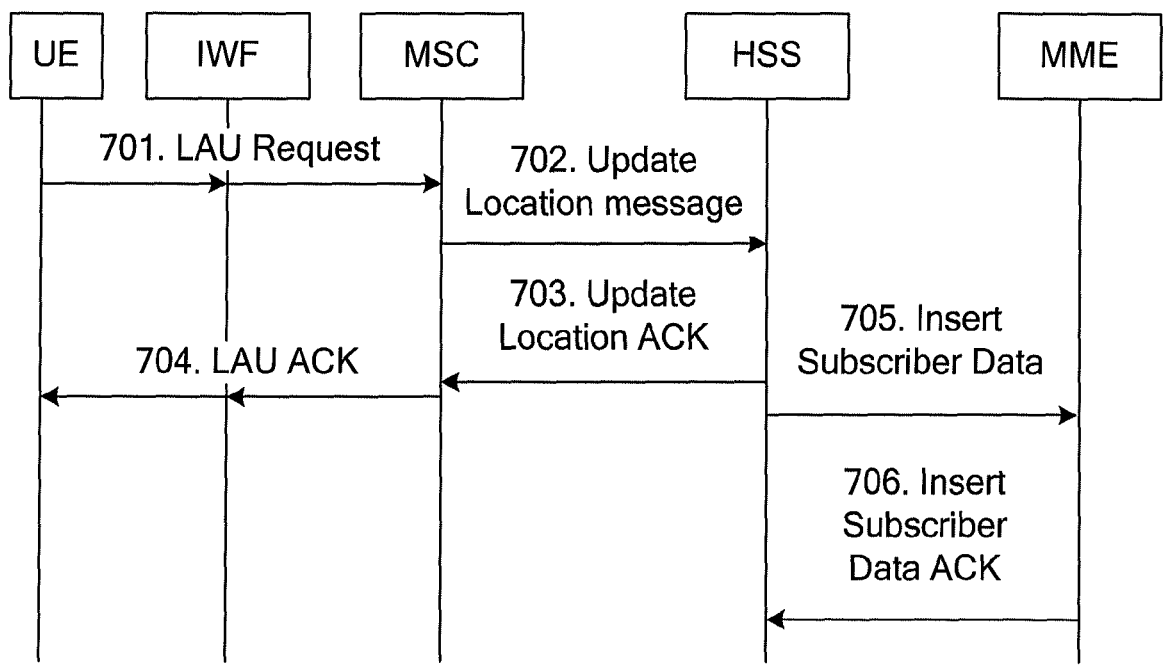
FIG. 7 shows a fifth procedure where an MME obtains address information of an IWF in the method according to an embodiment of the present invention.

If the MSC registers the IWF address information with the HSS, the procedure includes the following steps as shown in FIG. 7:

Step 701: The UE sends a Location Area Update (LAU) Request to the MSC through the IWF.

Step 702: The MSC sends an Update Location message to the HSS, where the message carries the address information of the serving IWF (that is, IWF ID).

This step may relate to two scenarios. In one scenario, when the MSC discovers that the serving IWF changes, the MSC is triggered to send an Update Location message to the HSS. In the other scenario, when the UE is initially registered with the MSC, the MSC is triggered to send an Update Location message to the HSS.

Step 703: The HSS returns an Update Location ACK to the MSC.

Step 704: The MSC returns a LAU ACK to the MSC.

Step 705: When the HSS discovers that the IWF information is updated, including when the serving IWF changes or the UE initially registers with the MSC, the HSS inserts subscription data to registered network elements such as an MME, where the subscription data carries the address information of the IWF where the UE is currently registered.

Step 706: The MME returns an Insert subscription data ACK to the HSS.

It should be noted that in the prior network architecture, because the IWF simulates the Iu-CS interface or A-interface, the MSC may regard the IWF as a Radio Network Subsystem (RNS) or BSS. In order to complete the registration of the IWF with the HSS, when the IWF simulates the Iu-CS interface or A-interface, the IWF needs to provide information to indicate that an IWF instead of an RNS or BSS is connected. This means that the simulated Iu-CS interface or A-interface message needs to carry information indicating that the related entity is the IWF. The form of the indication is not limited by the present invention. For example, the IWF may provide its address information to the MSC when the IWF is communicating with the MSC. After receiving the message that carries the address information, the MSC thinks the address information is related to an IWF and will later register the IWF address with the HSS. That is, the MSC needs to be aware of the IWF.

In addition, the IWF address information may be used as a part of the subscription data of the UE. For example, the serving IWF is defined when the user subscribes to the service. In this case, the IWF address information may be regarded as static IWF related subscription data. In the solution shown in FIG. 7, the IWF address information may be regarded as dynamic IWF related subscription data. When the MME registers with the HSS, the HSS sends the address information of the IWF to the MME as a part of the subscription data of the UE. When the serving MME of the UE changes, the new MME will initiate a registration procedure to the HSS. In this case, the HSS sends the IWF address information to the new MME as a part of the subscription data of the UE. Or, the MME stores the IWF address information in a UE context and when the MME changes, the source MME sends the IWF address information to the target MME.

Figure 8:
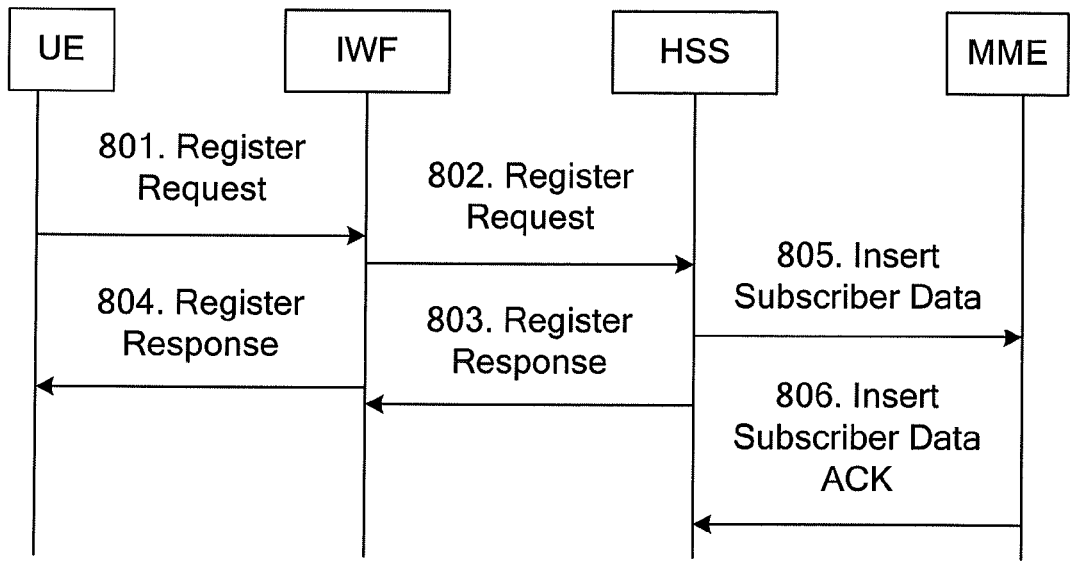
FIG. 8 shows a sixth procedure where an MME obtains address information of an IWF in the method according to an embodiment of the present invention.

If the IWF initiates a registration procedure to the HSS to register the IWF information with the HSS, the procedure includes the following steps as shown in FIG. 8:

Step 801: The UE sends a Register Request to the IWF.

Step 802: The IWF sends a Register Request to the HSS.

The Register Request carries an IWF ID to help the HSS to address the IWF to be registered with.

The Register Request may specifically be a Purge UE message.

Step 803: The HSS sends a Register Response to the IWF, for example, a Purge UE ACK.

In this step, the HSS may delete the previously stored serving IWF information before the change.

Step 804: The IWF sends a Register Response to the UE.

Step 805: When the HSS discovers that the IWF information is updated, the HSS inserts subscription data to a registered network element such as an MME, where the subscription data carries the address information of the serving IWF where the UE is currently registered.

Step 806: The MME returns an Insert subscription data ACK to the HSS.

It should be noted that the HSS sends the IWF address information to the MME proactively in the embodiment of the present invention, and that the MME may also request the HSS for the IWF address information.

Figure 9:
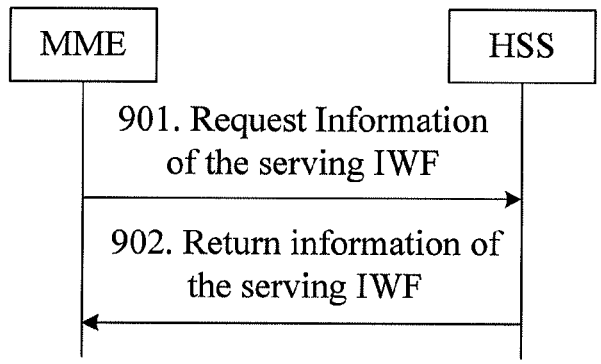
FIG. 9 shows a seventh procedure where an MME obtains address information of an IWF in the method according to an embodiment of the present invention.

As shown in FIG. 9, when the MME needs to interact with the IWF, the MME queries the HSS for the address information of the serving IWF. Specifically, the MME sends an IWF Request to the HSS, requesting the HSS for the address information of the serving IWF. Later, the HSS sends an IWF Response to the MME, providing the address information of the serving IWF to the MME.

In another embodiment of the method for implementing UE handover, the IWF sends its address information to a PDN-GW through a Policy and Charging Rules Function (PCRF) and the PDN-GW (P-GW) initiates a bearer activation procedure, providing the IWF address to the MME in a request message, so that the MME obtains the address information of the serving IWF.

Figure 10:
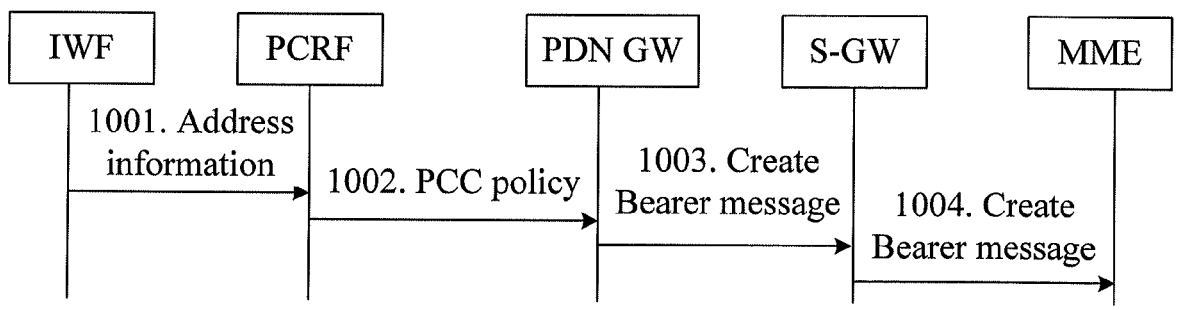
FIG. 10 shows an eighth procedure where an MME obtains address information of an IWF in the method according to an embodiment of the present invention.

As shown in FIG. 10, the method in the embodiment of the present invention includes the following steps:

Step 1001: The IWF triggers the PCRF to initiate an IP-CAN session modification procedure.

During the interaction, the IWF provides the IWF address information to the PCRF.

Step 1002: The PCRF provides a Policy and Charging Control (PCC) policy to the PDN-GW and transfers the IWF address information to the PDN-GW.

Specifically, the IWF address information may be carried in the PCC policy or carried in a message as an IE for separate transfer.

Step 1003: The PDN-GW sends a Create Bearer Request which carries the IWF address information to an S-GW.

Step 1004: The S-GW sends a Create Bearer Request that carries the IWF address information to the MME.

It should be noted that: In the embodiment of the present invention, the PDN-GW transfers the IWF address information to the MME through a Create Bearer Request but the embodiment does not exclude the case that the IWF address information is carried in other messages to the MME. For example, the IWF address information may be carried in an Update Bearer Request or Delete Bearer Request.

In another embodiment of the method for implementing UE handover, the UE initiates an attach or TAU procedure, and the PDN-GW provides the IWF address information and sends the IWF address information to the UE through the MME, so that the MME obtains the address information of the serving IWF.

Figure 11:
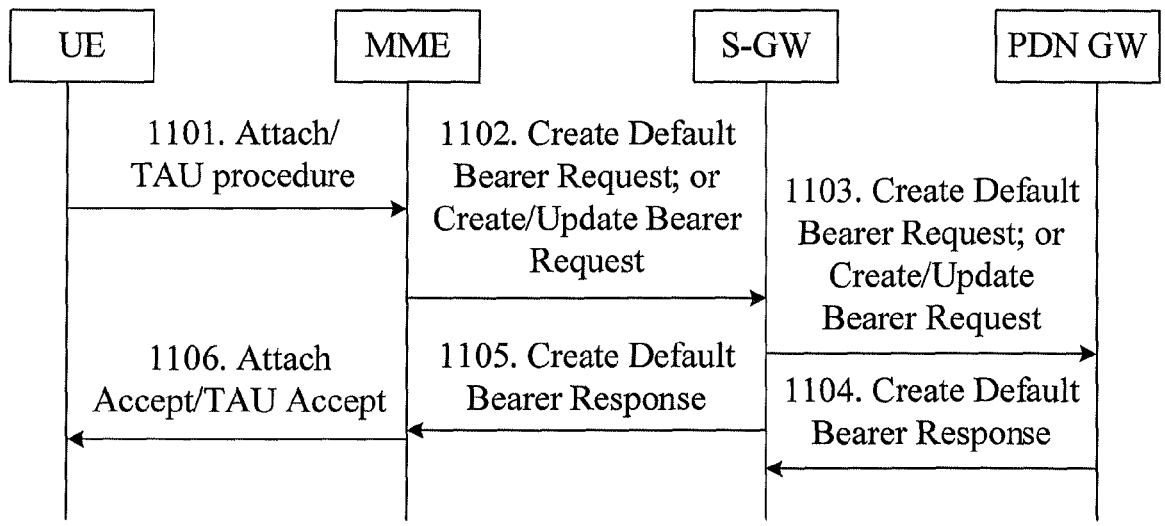
FIG. 11 shows a ninth procedure where an MME obtains address information of an IWF in the method according to an embodiment of the present invention.

As shown in FIG. 11, the method in the embodiment of the present invention includes the following steps:

Step 1101: The UE sends an Attach Request or TAU Request to the MME, where the message carries capability information indicating whether the UE supports CSoEPS or carries an indication, such as a CSoEPS indication or an IWF Address IE, instructing the network to send the IWF address to the UE.

For a CSoEPS-enabled EPS network, it is probably necessary to broadcast the CSoEPS capability information in a cell broadcast message. A CSoEPS-enabled. UE reports CSoEPS capability information to the network or requests the network for the IWF address only when the network also supports CSoEPS.

Step 1102: The MME obtains the CSoEPS capability information of the UE or sends a Create Default Bearer Request (related to the attach procedure) or a Create/Update Bearer Request (related to the TAU procedure) to the S-GW according to the CSoEPS indication or IWF Address reported by the UE. The message carries an indication such as a CSoEPS indication or an IWF Address IE, instructing the P-GW to provide the IWF address.

Step 1103: The S-GW forwards the Create Default Bearer Request (related to the attach procedure) or Create/Update Bearer Request (related to the TAU procedure) to the PDN-GW.

Step 104: The PDN-GW provides the IWF address to the MME according to the CSoEPS indication or IWF Address IE carried in the received message.

Specifically, the PDN-GW sends a Create Default Bearer Response which carries the IWF address information to the S-GW.

How the PDN-GW obtains the address information of the serving IWF of the UE may be configured by an operator. For example, the operator configures an available IWF address list and the PDN-GW selects a proper IWF from the list according to the returned load state.

Step 1105: The S-GW forwards the response message which carries the IWF address to the MME.

Step 1106: The MME sends an Attach Accept or TAU Accept message to the UE, where the message carries the IWF address information.

In another embodiment of the method for implementing UE handover, the MME that has obtained the address information of the serving IWF stores the IWF address information in a UE context; and when the MME changes, the source MME sends the IWF address information to the target MME. Therefore, the current serving MME of the UE obtains the address information of the serving IWF.

Figure 12:
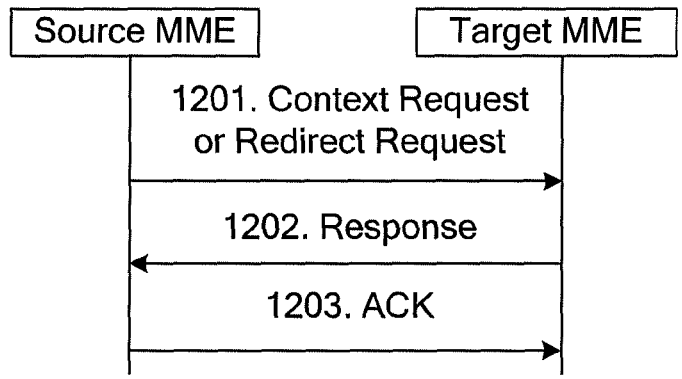
FIG. 12 shows a tenth procedure where an MME obtains address information of an IWF in the method according to an embodiment of the present invention.

As shown in FIG. 12, the method in the embodiment of the present invention includes the following steps:

Step 1201: When the MME that has obtained the address information of the serving IWF changes, the source MME sends the IWF address information to the target MME.

In this step, the IWF address information may be carried in a Context Request or Redirect Request in the form of an independent IE "IWF Address" or context information stored in the context of the UE, and transferred from the source MME (the MME before the change) to the target MME (the MME after the change).

Step 1202: The target MME sends a response to the source MME.

Step 1203: The source MME sends an ACK to the target MME.

In another embodiment of the method for implementing UE handover, the MME initiates a registration procedure to the serving IWF (including the MME where the UE is initially registered and a changed MME), so that the serving IWF obtains the address information of the serving MME and interacts with the MME proactively afterwards.

In the embodiment of the present invention, the MME may obtain the address information of the serving IWF of the UE in a mode described in any of the above embodiments.

Figure 13:
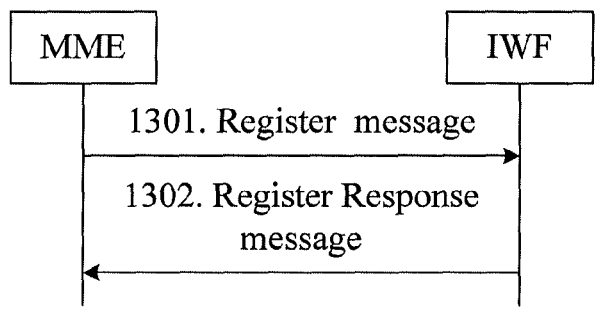
FIG. 13 shows an eleventh procedure where an MME obtains address information of an IWF in the method according to an embodiment of the present invention.

As shown in FIG. 13, in a scenario that a UE is initially registered with an MME, the method in the embodiment of the present invention includes the following steps:

Step 1301: The MME sends a Register message to the serving IWF.

The message carries the address information of the serving MME. The address information may be any information that denotes the MME address, such as the IP address of the MME, or MME ID, or GUTI of the MME.

The embodiment of the present invention does not limit the naming of the message provided that the function of the message is to provide information of the serving MME to the IWF so that the IWF can address the MME.

Step 1302: The IWF sends a Register Response to the MME.

In scenarios where the serving MME changes, the procedure where the target MME registers with the serving IWF includes the following scenarios:

(1) When the MME changes, the source MME sends the IWF address to the target MME, the target MME registers with the IWF proactively, and the IWF updates the MME address information.

(2) When the MME changes, the source MME sends the address of the target MME to the IWF, the IWF registers with the target MME, and then the target MME initiates a registration procedure to the IWF according to the IWF address information obtained when the IWF is registered.

Figure 14:
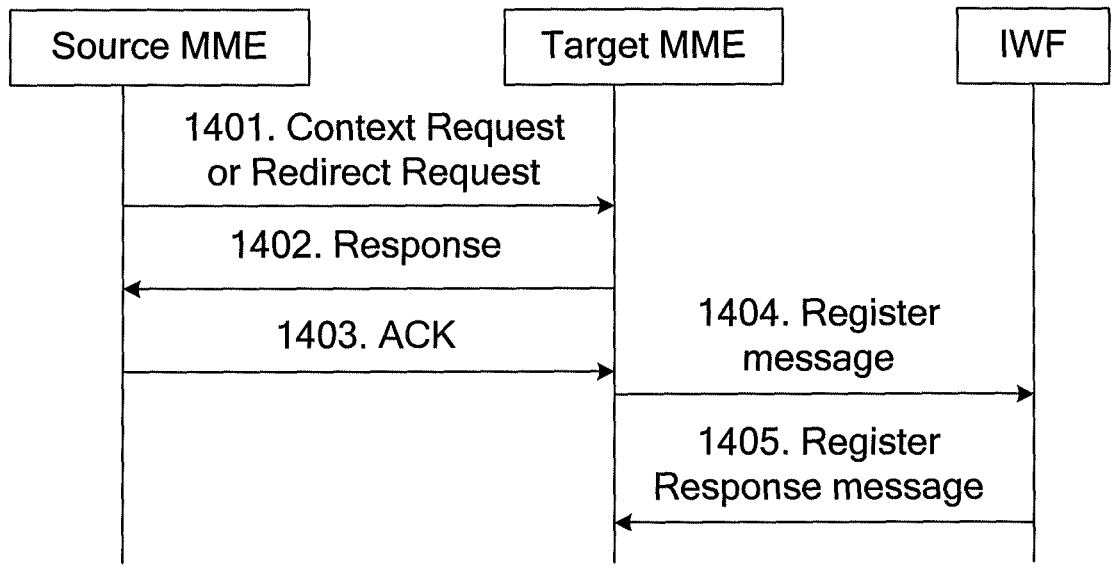
FIG. 14 shows a twelfth procedure where an MME obtains address information of an IWF in the method according to an embodiment of the present invention.

The implementation of the scenario (1) is illustrated in FIG. 14, including the following steps:

Step 1401: When the MME changes, the source MME sends the obtained address information of the serving IWF to the target MME.

In this step, the IWF address information may be carried in a Context Request or Redirect Request, in the form of an independent IE or context information stored in the context of the UE, and transferred from the source MME to the target MME.

Step 1402: The target MME sends a response to the source MME.

Step 1403: The source MME sends an ACK to the target MME.

Step 1404: The target MME registers with the IWF.

Step 1405: The IWF sends a Register Response to the target MME.

Figure 15:
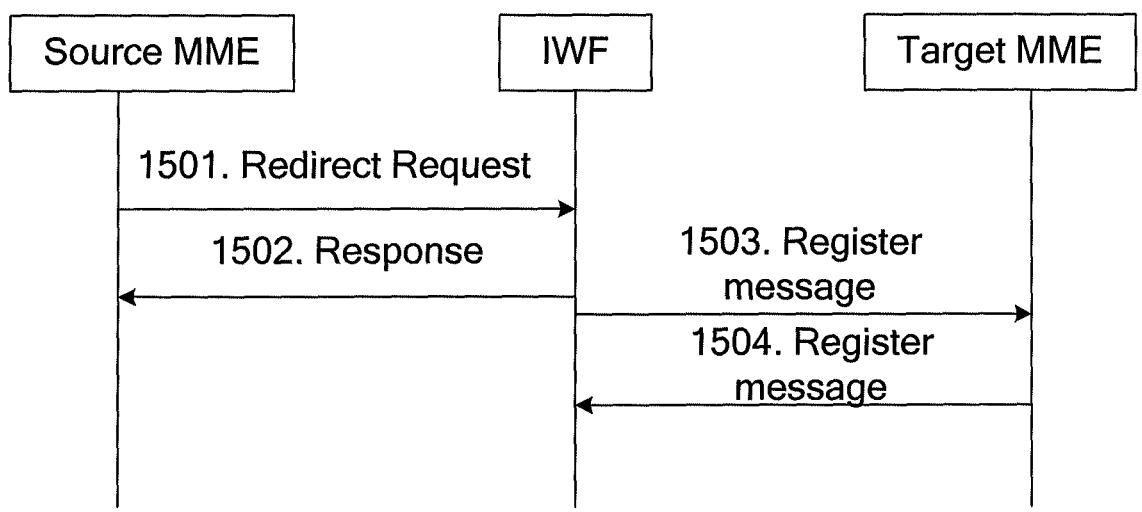
FIG. 15 shows a thirteenth procedure where an MME obtains address information of an IWF in the method according to an embodiment of the present invention.

The implementation of the scenario 2) is illustrated in FIG. 15, including the following steps:

Step 1501: When the MME changes, the source MME sends a message such as a Redirect Request to transfer the address information of the target MME to the IWF.

Step 1502: The IWF sends a Register Response to the source MME.

Step 1503: The IWF sends a Register message to the target MME to register with the target MME. The message carries the address information of the IWF.

Step 1504: The target MME registers with the IWF according to the obtained IWF address information.

In the embodiments of the present invention, through the interaction between network entities and the MME, the MME obtains the address information of the serving IWF and notifies the IWF to process handover according to the obtained address information. Therefore, the method provided in the embodiments of the present invention ensures normal proceeding of a UE handover procedure in a CSoEPS scenario. An interface is designed between the IWF and the HSS, so that the IWF can exchange signaling with the HSS through the new interface. In addition, in the embodiments of the present invention, the IWF may know the address information of the MME, so that the IWF can exchange signaling with the MME proactively when needed.

Figure 16:
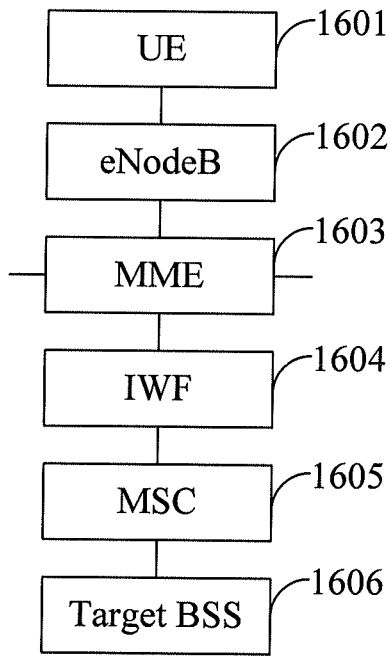
FIG. 16 illustrates a structure of a system for implementing UE handover according to an embodiment of the present invention.

An embodiment of the present invention provides a system for implementing UE handover. As shown in FIG. 16, the system includes a UE 1601, an eNodeB 1602, an MME 1603, an IWF 1604, an MSC 1605, and a target BSS 1606.

The operations of the system include:

The source eNodeB 1602 receives a measurement report sent by the UE 1601 and triggers handover of the UE from an LTE network to a GERAN or UTRAN.

The source eNodeB 1602 sends a Handover Required message to the MME 1603.

The Handover Required message carries an IE instructing the source MME to hand an LTE network service over to the CS domain of the GERAN or UTRAN.

The MME 1603 interacts with a network entity such as the UE 1601 to obtain the address information of the serving IWF 1604 (the serving IWF) in the current network.

The process that the MME 1603 obtains the address information of the IWF 1604 can be implemented according to the technical solutions provided in the embodiments of the present invention shown in FIG. 3 to FIG. 15.

The MME 1603 notifies the IWF 1604 to process handover according to the obtained address information of the IWF 1604. Specifically, the MME 1603 sends a Handover Request to notify the IWF 1604 to process handover.

The IWF 1604 receives the Handover Request, converts the Handover Request into a CS Handover Request, and sends the CS Handover Request to the MSC 1605.

The MSC 1605 allocates a resource with the BSS 1606.

The MSC 1605 notifies the IWF 1604 that resource allocation is complete.

The IWF 1604 notifies the MME 1603 that the resource in the target network is set up.

The MME 1603 notifies the source eNodeB 1602 that handover preparation is complete.

The source eNodeB 1602 notifies the UE 1601 to hand over to the target network.

The UE 1601 accesses the GERAN. The handover from the LTE network to the CS domain of the GERAN or UTRAN is complete.

In the embodiment of the present invention, through the interaction between network entities and the MME, the MME obtains the address information of the serving IWF and notifies the IWF to process handover according to the obtained address information. Therefore, the system provided in the embodiment of the present invention ensures normal proceeding of a UE handover procedure in a CSoEPS scenario.

An embodiment of the present invention provides an MME which interacts with a function entity in the network to obtain the address information of a serving IWF and sends a Handover Request to the IWF according to the obtained IWF address.

Figure 17:
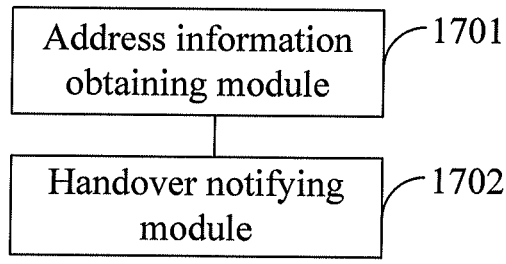
FIG. 17 illustrates a structure of an MME according to an embodiment of the present invention.

As shown in FIG. 17, the MME in the embodiment of the present invention includes an address information obtaining module 1701 and a handover notifying module 1702.

The address information obtaining module 1701 is adapted to interact with a function entity in the network to obtain the address information of the serving IWF.

The specific operation process of the address information obtaining module 1701 can be implemented according to the technical solutions provided in the embodiments of the present invention shown in FIG. 3 to FIG. 15 and is not further described here.

The handover notifying module 1702 is adapted to notify the IWF to process handover according to the address information of the IWF obtained by the address information obtaining module 1701.

The handover notification may be a Handover Request. The information carried in the Handover Request may be any information required by the UE handover. The embodiment of the present invention does not limit such information.

In the embodiment of the present invention, through the interaction with a network entity, the MME obtains the address information of the serving IWF and notifies the IWF to process handover according to the obtained address information. Therefore, the MME provided in the embodiment of the present invention ensures normal proceeding of a UE handover procedure in a CSoEPS scenario.

An embodiment of the present invention provides a UE, which interacts with an MME so that the MME obtains address information of the serving IWF.

Figure 18:
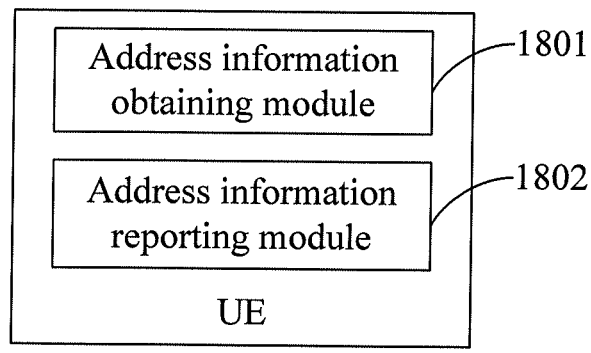
FIG. 18 illustrates a structure of a UE according to an embodiment of the present invention.

As shown in FIG. 18, the UE in the embodiment of the present invention includes:

an address information obtaining module 1801, adapted to obtain the address information of the serving IWF; and an address information reporting module 1802, adapted to interact with the MME to report the IWF address information obtained by the address information obtaining module 1801 to the MME.

Specifically, the UE in the embodiment of the present invention may send a NAS message to report the address information of the serving IWF to the MME, or the UE initiates an attach or TAU procedure where the PDG-GW provides the IWF address information and sends the IWF address information to the UE through the MME, so that the MME obtains the address information of the serving IWF. The specific process can be implemented according to the technical solutions provided in the embodiments of the present invention shown in FIGS. 3, 4 and 11.

From the above description, the UE in the embodiment of the present invention interacts with the MME in the network so that the MME obtains the address information of the serving IWF. Therefore, the UE in the embodiment of the present invention ensures normal proceeding of a UE handover procedure in a CSoEPS scenario.

An embodiment of the present invention provides an IWF, which interacts with an MME so that the MME obtains address information of the serving IWF.

Figure 19:
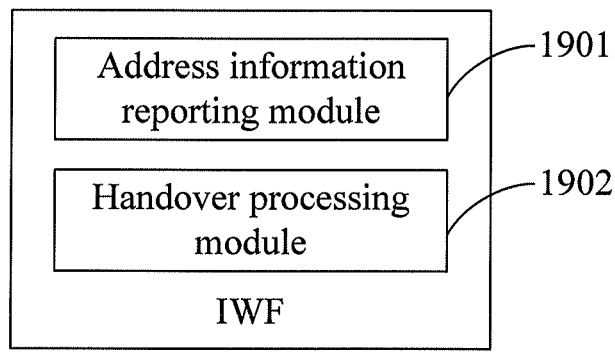
FIG. 19 illustrates a structure of an IWF according to an embodiment of the present invention.

As shown in FIG. 19, the IWF in the embodiment of the present invention includes:

an address information reporting module 1901, adapted to interact with the MME to report its address information to the MME; and a handover processing module 1902, adapted to process handover according to the handover notification sent by the MME.

The IWF provided in the embodiment of the present invention interacts with the UE or HSS to obtain the address information of the MME and registers with the MME according to the obtained address information, so that the MME obtains the address information of the serving IWF; or the IWF sends its address information to the PDN-GW through a PCRF and the PDN-GW initiates a bearer activation procedure to send the IWF address to the MME in a request message, so that the MME obtains the address information of the serving IWF. The specific process can be implemented according to the technical solutions provided in the embodiments of the present invention shown in FIGS. 5, 6 and 10.

From the above description, the IWF in the embodiment of the present invention interacts with the MME in the network so that the MME obtains the address information of the serving IWF. Therefore, the IWF in the embodiment of the present invention ensures normal proceeding of a UE handover procedure in a CSoEPS scenario.

An embodiment of the present invention provides an HSS, which interacts with an MME so that the MME obtains address information of the serving IWF.

Figure 20:
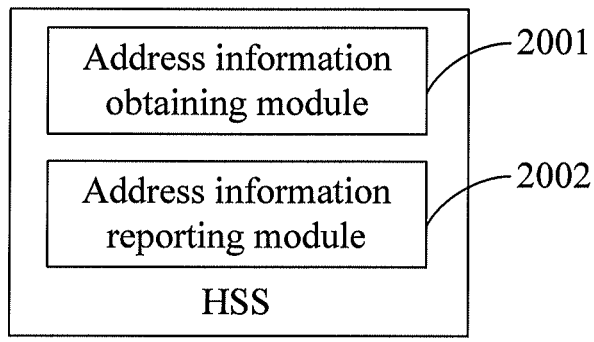
FIG. 20 illustrates a structure of an HSS according to an embodiment of the present invention.

As shown in FIG. 20, the HSS in the embodiment of the present invention includes:

an address information obtaining module 2001, adapted to obtain the address information of the serving IWF; and an address information reporting module 2002, adapted to interact with the MME to report the IWF address information obtained by the address information obtaining module 2001 to the MME.

Specifically, the HSS provided in the embodiment of the present invention may obtain the IWF address information sent by the MSC when receiving the registration of the MSC; or obtain the IWF address information in a registration procedure initiated by the IWF. Afterwards, the HSS sends the IWF address information to the MME as subscription data, so that the MME obtains the address information of the serving IWF. The specific process can be implemented according to the technical solutions provided in the embodiments of the present invention shown in FIGS. 7, 8 and 9.

From the above description, the HSS in the embodiment of the present invention interacts with the MME in the network so that the MME obtains the address information of the serving IWF. Therefore, the HSS in the embodiment of the present invention ensures normal proceeding of a UE handover procedure in a CSoEPS scenario.

It should be noted that: the path between the UE and the IWF in the embodiments of the present invention is provided by the EPS network in the CSoEPS scenario. In practice, the path between the UE and the IWF may be provided by a GERAN or UTRAN. Accordingly, the function entity that needs to obtain the IWF address includes the Serving GPRS Support Node (SGSN) in the GERAN or UTRAN. In this case, the SGSN can obtain the IWF address according to the IWF address information obtaining method provided in the embodiments of the present invention by substituting the SGSN for the MME.

This means that, in different network architectures, function entities such as the SGSN that need to obtain the IWF address can all adopt the IWF address information obtaining method provided in the embodiments of the present invention to obtain the IWF address information. From another aspect, this shows that the IWF address information obtaining method provided in the embodiments of the present invention is highly compatible, highly scalable, and highly transplantable.

An embodiment of the present invention provides another solution where the UE provides MME address information to the IWF and the IWF performs a Domain Name Service (DNS) resolution on the MME address information provided by the UE to obtain the IP address of the MME. The MME address information may be a GUTI or a Globally Unique MME Identity (GUMMEI) which includes an MME ID. The IWF performs a DNS resolution according to the MME ID to obtain the IP address of the MME.

Figure 21:
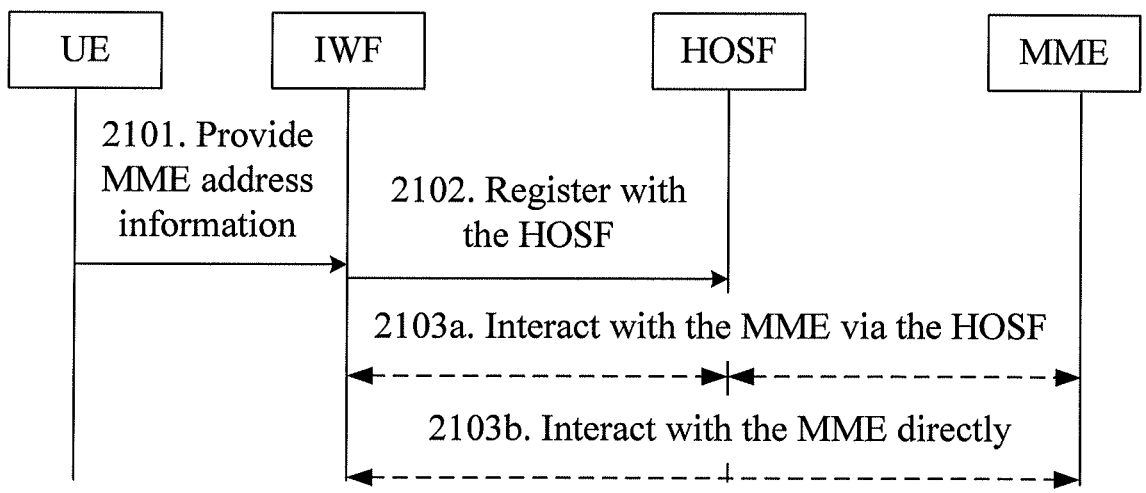
FIG. 21 illustrates a procedure of the method according to an embodiment of the present invention.

As shown in FIG. 21, the solution provided in the embodiment of the present invention includes the following steps:

Step 2101: The UE provides address information of the MME to the IWF during an interaction with the IWF.

An interaction scenario in which the UE provides the address information of the MME to the IWF includes any one or all of the following scenarios:

(1) The UE provides the MME address information to the IWF during registration with the IWF, including initial registration procedure or register redirect procedure because of the change of a serving IWF.

Specifically, the GUTI or GUMMEI is carried in a UE-IWF DISCOVERY REQUEST or UE-IWF REGISTER REQUEST sent by the UE to the IWF.

It should be noted that the embodiment of the present invention does not exclude the case that related messages of other interactions with the IWF also carry the GUTI or GUMMEI. For example, a UE-IWF REGISTER UPDATE UPLINK message carries the GUTI or GUMMEI; in a defined periodical update procedure, a UE-IWF KEEP ALIVE message sent by the UE to the IWF carries the GUTI or GUMMEI.

(2) The UE provides the MME address information to the IWF when a CS service is triggered, for example, a CS service originated or terminated by the UE. Specifically, a UE-IWF REQUEST sent by the UE to the IWF in a UE-IWF connection setup procedure carries the GUTI or GUMMEI; or, in a defined procedure of CS signaling connection setup initiated by the UE, a UE-IWF UL DIRECT TRANSFER message sent by the UE to the IWF carries the GUTI or GUMMEI.

(3) In a case that the UE is already registered with the serving IWF, if the UE receives a GUTI or GUMMEI allocated by the MME (for example, when the MME changes), the message sent by the UE to the IWF, such as a UE-IWF REGISTER UPDATE UPLINK, carries the updated GUTI or GUMMEI.

It should be noted that: If the IWF stores the address information of the MME, when the IWF discovers that the stored address information of the MME changes, the IWF addresses an MME of the new address information and initiates a registration procedure to the MME of the new address information.

The trigger condition for the UE to send the packet to the IWF includes the above scenarios (1), (2) and (3).

Figure 22:
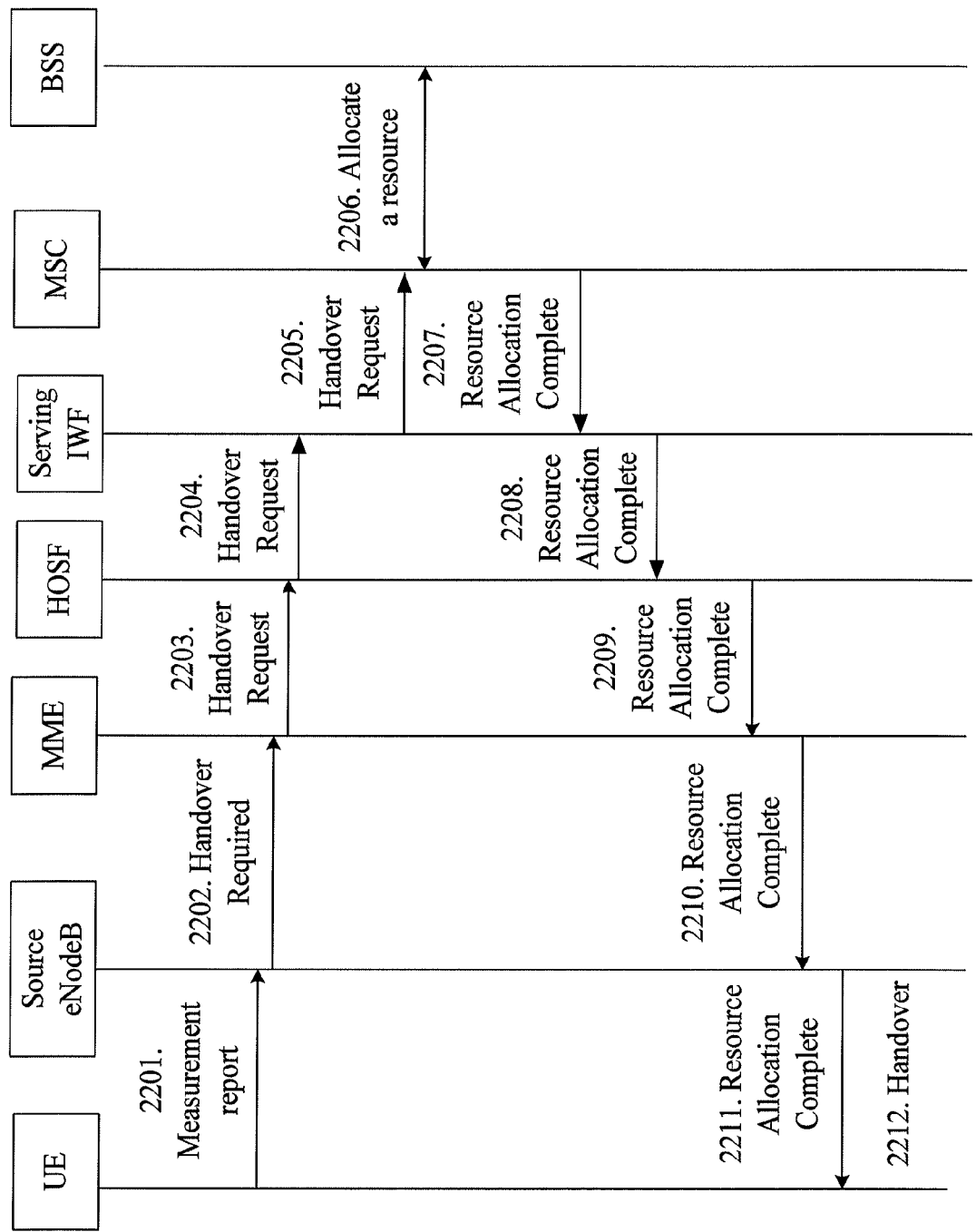
FIG. 22 shows a procedure of the method for implementing UE handover according to an embodiment of the present invention.
Figure 23:
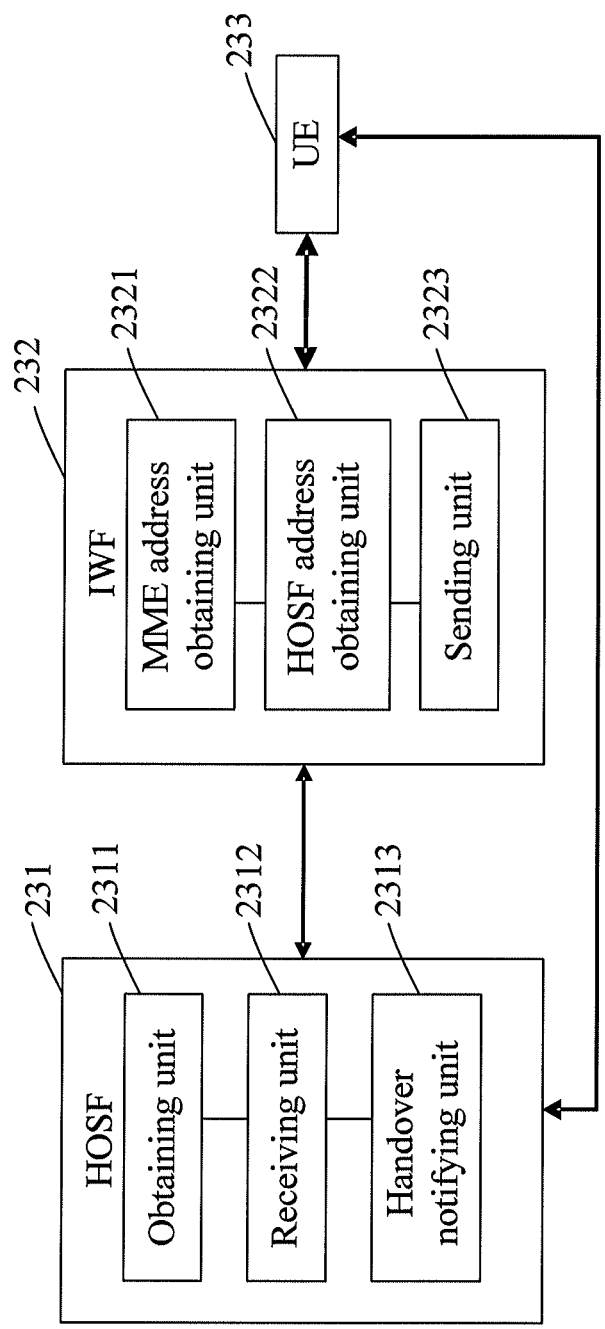
FIG. 23 illustrates a structure of the system according to an embodiment of the present invention.

Step 2102: The IWF obtains the address information of the current serving MME of the UE and addresses a Handover Selection Function (HOSF) according to the MME address information; the IWF registers with the HOSF so that the HOSF obtains the address information of the IWF. Therefore, during subsequent handover, the HOSF can address the serving IWF of the UE. As shown in FIG. 22, the specific procedure is as follows:

The method for HOSF addressing according to the MME address may be: performing a DNS resolution according to the information such as a GUTI provided by the UE in step 2101 to obtain the address information such as the IP address of the HOSF. If multiple HOSF addresses are obtained by the resolution, the IWF can initiate a registration procedure to the multiple HOSFs. The Register message may carry the IWF address information and the user ID (IMSI and/or GUTI). The difference between HOSF addressing according to the MME address and MME addressing according to the MME address is: the former requires the DNS server to configure a relation between the HOSF and the MME, and the DNS server identifies information of the related MME according to the GUTI (including the MME ID) provided by the IWF and then returns the address (IP address) of the HOSF to the IWF according to the relation between the MME and the HOSF. In the case of the latter, the DNS server identifies information of the related MME according to the GUTI (including the MME ID) and returns the address (IP address) of the MME to the IWF.

Or, queries the preconfigured information on the IWF according to the MME information (such as the MME ID included in the GUTI) provided by the UE to find the information of the HOSF associated with the MME information. If multiple HOSF addresses are obtained by the resolution, the IWF can initiate a registration procedure to the multiple HOSFs. The Register message may carry the IWF address information and the user ID (IMSI and/or GUTI).

The HOSF is a logical entity and the present invention does not exclude the case that the HOSF is physically combined with the MME. In this case, the process of the IWF addressing the HOSF according to the obtained address information of the current serving MME of the UE is in fact addressing the MME, as in the fifth embodiment of the present invention.

Step 2103: The IWF interacts with the MME. This includes the following two ways:

Step 2103a: The HOSF stores the MME address information (such as a GUTI) provided by the IWF and later when the IWF sends a message to the HOSF, the HOSF can forward the message to the MME. The HOSF may address the MME as follows: performing a DNS resolution according to the MME address information (such as a GUTI) to obtain the address information (such as an IP address) of the MME. The IWF may provide the MME address information to the HOSF in the following way: the HOSF receives a message that carries a GUTI which includes the MME ID from the IWF; the HOSF resolves the GUTI to obtain the MME address information.

Or, queries configuration information according to the MME information (such as the MME ID included in the GUTI) provided by the UE to find the information of the MME associated with the MME information.

The IWF addresses the HOSF according to the MME address information provided by the UE to send the MME information to the HOSF. The HOSF interacts with the MME according to the MME information. Therefore, the IWF can interact with the MME indirectly.

Step 2103b: The IWF stores the address information (such as a GUTI) of the MME to ensure that the IWF can later address the MME and interact with the MME. The IWF may address the MME as follows: performing a DNS resolution according to the MME address information (such as a GUTI) to obtain the address information (such as an IP address) of the MME.

Or, queries configuration information according to the MME information (such as the MME ID included in the GUTI) provided by the UE to find the information of the MME associated with the MME information.

Step 2102 in the embodiment of the present invention provides a method for the IWF to obtain the MME address. An exemplary embodiment of the MME addressing method is as follows: the IWF receives a message that carries GUTI information from the UE, where the GUTI information includes an MME ID; the IWF resolves the GUTI to obtain the MME address information and sends a service processing message which may be a handover message to the MME indicated by the MME address information, to obtain the location information of the UE. This method is applicable to other scenarios where the IWF needs to address the MME and further interacts with the MME. One of the scenarios is: the MSC sends a location request to the IWF, the IWF needs to address the MME, and the MME sends a message requesting the location information of the UE and returns the location of the UE to the MSC. The resolution process is: the IWF performs a DNS resolution according to the MME ID provided by the UE to obtain the IP address of the MME. Specifically, the IWF constructs a domain name using the MME ID and queries the DNS server for the address corresponding to the MME ID and the DNS server returns the IP address of the MME corresponding to the MME ID to the IWF.

The embodiment of the present invention further provides a method for the HOSF to obtain the MME address. Specifically, the HOSF receives a message that carries GUTI information sent by the IWF, where the GUTI includes an MME ID; the HOSF resolves the GUTI to obtain the MME address information and sends a service processing message to the MME indicated by the MME address. The message that carries GUTI information sent by the IWF and received the HOSF is specifically the message sent by the IWF when the IWF registers with the HOSF. The resolution process is similar to the resolution process of the IWF. This method can be adopted in step 2103a.

As shown in FIG. 22, a method for implementing UE handover in an embodiment of the present invention includes the following steps:

Step 2201: A source eNodeB receives a measurement report sent by a UE and triggers handover of the UE from an LTE network to a GERAN or UTRAN.

Step 2202: The source eNodeB sends a Handover Required message to the MME.

The Handover Required message carries an IE instructing the source MME to hand an LTE network service such as a voice service over to the CS domain of the GERAN or UTRAN.

Step 2203: The MME sends a Handover Request to the HOSF. The MME addresses the HOSF by performing a DNS resolution (according to the Target ID provided by the MME) to obtain the address information (such as an IP address) of the HOSF. If multiple HOSF addresses are obtained by the resolution, the MME initiates a registration procedure to the multiple HOSFs.

Note the HOSF address information obtained by the MME is the HOSF where the IWF is registered shown in FIG. 21, or the address information of the multiple HOSFs obtained by the MME includes the address information of the one or multiple HOSFs where the IWF is registered shown in FIG. 21. Specifically, this can be implemented by configuring the DNS server.

Or, the method for HOSF addressing by the MME is as follows: MMEs logically correspond to HOSFs and the MME corresponds to one or multiple HOSFs. The MME sends the Handover Request to the one or multiple HOSFs according to the relation.

Step 2204: The HOSF sends the Handover Request to the IWF.

The IWF is the serving IWF in the EPS network.

Step 2205: The IWF receives the Handover Request and converts the Handover Request into a CS Handover Request and sends the CS Handover Request to an MSC.

The MSC is the serving MSC in the EPS network.

Step 2206: The MSC allocates a resource with the target BSS.

Step 2207: The MSC notifies the IWF that resource allocation is complete.

Step 2208: The MSC notifies the HOSF that resource allocation is complete.

Step 2209: The IWF notifies the MME that the resource is set up on the target network.

Step 2210: The MME notifies the source eNodeB that handover preparation is complete.

Step 2211: The source eNodeB notifies the UE to hand over to the target network.

Step 2212: The UE accesses the GERAN. The handover from the LTE network to the CS domain of the GERAN or UTRAN is complete.

In the embodiment of the present invention, through a function entity in the network, the HOSF obtains the address information of the serving IWF and notifies the IWF to process handover according to the obtained address information. Therefore, the method provided in the embodiment of the present invention ensures normal proceeding of a UE handover procedure in a CSoPS scenario.

A system provided in an embodiment of the present invention includes an HOSF 221, an IWF 222, and a UE 223. The HOSF 221 further includes an obtaining unit 2311, a receiving unit 2312, and a handover notifying unit 2313. The IWF 222 further includes an MME address obtaining unit 2321, an HOSF address obtaining unit 2322, and a sending unit 2323.

The MME address obtaining unit 2321 of the IWF 232 is adapted to interact with the UE 233 to obtain the address information of the serving MME.

The HOSF address obtaining unit 2322 of the IWF 232 is adapted to obtain the address information of the HOSF according to the MME address information.

The sending unit 2323 of the IWF 232 is adapted to provide the address of the IWF 232 to the HOSF 231 indicated by the HOSF address information.

The obtaining unit 2311 of the HOSF 231 is adapted to obtain the address information of the IWF 232.

The receiving unit 2312 of the HOSF 231 is adapted to receive the UE handover notification.

The handover notifying unit 2313 of the HOSF 231 is adapted to notify the IWF 232 to process handover according to the obtained IWF address information.

An embodiment of the present invention provides an HOSF which includes:

a receiving unit, adapted to receive a message sent by the UE, where the message carries GUTI information which includes an MME ID; and a resolving unit, adapted to resolve the GUTI information to obtain the MME.

The resolving unit further includes a querying unit, adapted to query the DNS server for the address corresponding to the MME ID; the receiving unit is further adapted to receive the IP address of the MME corresponding to the MME ID returned by the DNS server to the HOSF.

An embodiment of the present invention provides an IWF which includes:

a receiving unit, adapted to receive a message sent by the IWF, where the message carries GUTI information which includes an MME ID; and a resolving unit, adapted to resolve the GUTI to obtain the MME.

The resolving unit further includes a querying unit, adapted to query the DNS server for the address corresponding to the MME ID; the receiving unit is further adapted to receive the IP address of the MME corresponding to the MME ID returned by the DNS server to the HOSF.

Through the foregoing description of the embodiments of the present invention, those skilled in the art will understand that the invention can be implemented through software on a necessary universal hardware platform or through hardware only. In most circumstances, the former is preferred. Based on such understanding, the part contributed by the technical solution to the prior art can be reflected in the form of a software product. The software product may be stored in a computer readable storage medium, such as a Read Only Memory (ROM), a Random Access Memory (RAM), a magnetic disk, or a Compact Disk-Read Only Memory (CD-ROM) and include a number of instructions that enable a computer device (such as a personal computer, a server, or a network device) to execute the methods described in the embodiments or certain portions of the embodiments.

Although the present invention has been described in detail through some preferred embodiments, the invention is not limited to such embodiments. It is apparent that those skilled in the art can make various modifications and variations to the invention without departing from the scope of the present invention. The invention is intended to cover the modifications and variations provided that they fall within the scope of protection defined by the claims or their equivalents.

What is claimed is:

1. A method for implementing User Equipment (UE) handover, comprising:

obtaining, by a Handover Selection Function (HOSF), address information of a serving Interworking Function (IWF), which is provided by the serving IWF according to address information of the HOSF after the serving IWF interacts with a UE to obtain address information of a Mobility Management Entity (MME) which the UE is registered with and obtains the address information of the HOSF according to the address information of the MME;

receiving, by the HOSF, a handover request from the MME; and sending, by the HOSF, the handover request to the serving IWF according to the obtained address information of the serving IWF.

2. The method of claim 1, wherein the address information of the MME is obtained from a Globally Unique Temporary Identity (GUTI).

3. An Interworking Function (IWF) device, the IWF device comprising:

a Mobility Management Entity (MME) address obtaining unit, adapted to interact with a User Equipment (UE) to obtain address information of a Mobility Management Entity (MME) which the UE is registered with;

a Handover Selection Function (HOSF) address obtaining unit, adapted to obtain address information of an HOSF according to the address information of the MME; and a sending unit, adapted to provide address information of the IWF to the HOSF corresponding to the address information of the HOSF;

a receiving unit, adapted to receive a handover request which is sent by the HOSF and according to the address information of the IWF.

4. The method of claim 3, wherein the address information of the MME is obtained from a Globally Unique Temporary Identity (GUTI).

5. A method for implementing User Equipment (UE) handover, comprising:

obtaining, by an Interworking Function (IWF), address information of a Mobility Management Entity (MME) which a UE is registered with, by interacting with the UE;

obtaining, by the IWF, address information of a Handover Selection Function (HOSF) according to the address information of the MME; and providing, by the IWF, address information of the IWF to the HOSF corresponding to the address information of the HOSF;

receiving, by the IWF, a handover request which is sent by the HOSF and according to the address information of the IWF.

6. The method of claim 5, wherein the address information of the MME is obtained from a Globally Unique Temporary Identity (GUTI).

7. The method of claim 5, wherein the providing, by the IWF, the address information of the IWF to the HOSF corresponding to the address information of the HOSF comprises:

registering, by the IWF, with the HOSF and reporting the address information of the IWF to the HOSF during a registration process.

8. The method of claim 5, wherein the obtaining, by the IWF, the address information of the MME which the UE is registered with, by interacting with the UE, comprises:

receiving, by the IWF, the address information of the MME from the UE when the UE registers with the IWF.

9. The method of claim 5, wherein the obtaining, by the IWF, the address information of the MME which the UE is registered with, by interacting with the UE, comprises:

receiving, by the IWF, the address information of the MME from the UE when a CS service is triggered.

10. The method of claim 5, wherein the obtaining, by the IWF, the address information of the MME which the UE is registered with, by interacting with the UE, comprises:

receiving, by the IWF, the address information of the MME from the UE when the UE receives the address information of the MME sent by the MME.

11. A Handover Selection Function (HOSF) device, the HOSF device comprising:

obtaining unit, adapted to obtain address information of a serving Interworking Function (IWF), which is provided by the serving IWF according to address information of the HOSF after the serving IWF interacts with a UE to obtain address information of a Mobility Management Entity (MME) which the UE is registered with and obtains the address information of the HOSF according to the address information of the MME;

receiving unit, adapted to receive a handover request from the MME; and handover notifying unit, adapted to send the handover request to the serving IWF according to the obtained address information of the serving IWF.

12. The method of claim 11, wherein the address information of the MME is obtained from a Globally Unique Temporary Identity (GUTI).

* * * * *